June 4, 1963  H. HOLZRICHTER ET AL  3,092,662
PROCESS FOR THE CONTINUOUS PRODUCTION OF
N-ISOPROPYL-N'-PHENYL-P-PHENYLENE
DIAMINE
Filed March 31, 1959
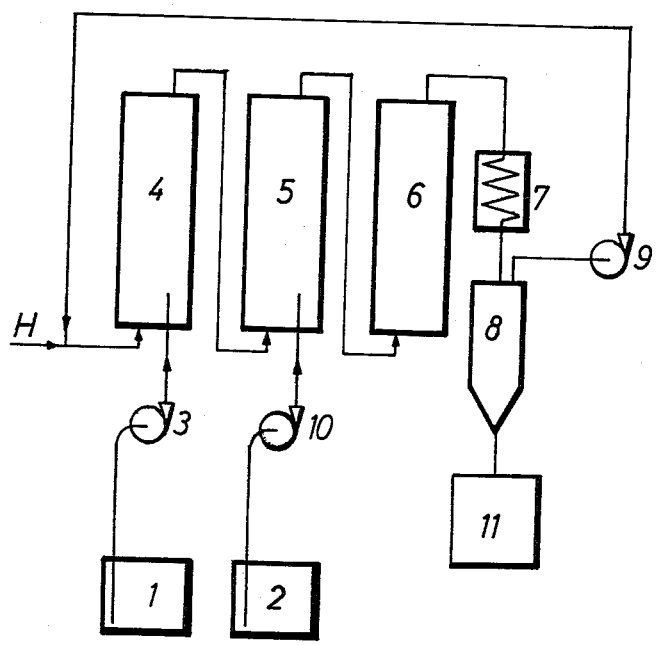
HERMANN HOLZRICHTER, THEODOR KÖNIG, HELMUT DIERICHS.
INVENTORS:
BY
Connolly and Hutz
ATTORNEYS 3,092,662
PROCESS FOR THE CONTINUOUS PRODUCTION OF N-ISOPROPYL-N'-PHENYL-p-PHENYLENE DIAMINE
Hermann Holzrichter and Theodor König, Leverkusen-Bayerwerk, and Helmut Dierichs, Leverkusen, Germany, assignors to Farbenfabriken Bayer Aktiengesellschaft, Leverkusen, Germany, a corporation of Germany
Filed Mar. 31, 1959, Ser. No. 803,235
Claims priority, application Germany Apr. 5, 1958
3 Claims. (Cl. 260—576)

This invention relates to N-isopropyl-N'-phenyl-p-phenylene diamine and to a process for its production.

It is known that N-isopropyl-N'-phenylene diamine can be prepared from p-aminodiphenylamine, acetone and elementary hydrogen in the presence of catalysts at elevated temperature and pressure. It is an object of the present invention to provide an improved process for the production of N-isopropyl-N'-phenyl-p-phenylene diamine. A further object is to provide a continuous process for the production of said N-isopropyl-N'-phenyl-p-phenylene diamine. Another object is to provide said compound with a high conversion and a good yield. Still other objects will appear hereinafter. These objects are attained in accordance with the present invention by carrying out the reaction of p-aminodiphenylamine, acetone and elementary hydrogen in the presence of catalysts at elevated temperature and pressure in a plurality of series-connected reaction chambers which can be followed by a final reactor wherein one portion each of the acetone entirely used is introduced into each reaction chamber. The process of the present invention may be further illustrated by reference to the diagram of the accompanying drawing.

The p-aminodiphenylamine is dissolved in acetone in the vessel 1 and then the catalyst is added thereto. This mixture is pumped continuously, by means of the pump 3, into the high-pressure container 4, which is under a pressure of 150 to 200 atm. Provision is made by means of a built-in cooling and heating system for the temperature in the high-pressure container to not substantially exceed 200° C. The reaction product leaves the high-pressure reaction chamber 4 by way of an overflow and enters the high-pressure reaction chamber 5, which is under substantially the same temperature and pressure conditions as the high-pressure reaction chamber 4. Acetone is additionally pumped by the pump 10 from the vessel 2 into the high-pressure reaction chamber 5. After leaving the high-pressure reaction chamber 5, the reaction product passes by overflow into the high pressure container (final reactor) 6 which for safety reasons follows the reaction chamber 5 and is under approximately the same temperature and pressure conditions as the high-pressure reaction chamber 4 and 5. The reaction product leaving the last high-pressure container is cooled by the condenser 7 and conveyed into the separator 8. From the separator 8, the excess hydrogen is extracted by means of the gas circulating pump 9 and introduced once again into the high-pressure reaction chamber 4. The hydrogen consumed by the reaction is continuously replaced through the line H. The reaction product leaving the separator 8 is collected in the reservoir 11 and can be worked up in the usual way.

The conventional catalysts, such for example as a copper-chromium catalyst, can be used for the process of the present invention, the said catalyst being for example obtained by the process disclosed in German patent specification No. 851,053. The process is carried out expediently at temperatures in the range between substantially 180 and 210° C., advantageously 190 to 200° C. The hydrogen pressure used is preferably 180 to 200 atm.

The quantity of acetone employed is between approximately 1.5 and 4 mols of acetone per mol of p-aminodiphenylamine. Greater quantities of acetone are generally not economical but can be used if desired. At least substantially 1 mol of acetone is introduced into the first reaction chamber per mol of p-aminodiphenylamine and then the remainder of the quantity of acetone which is used in total for one reaction is distributed into the other reaction chambers, for example in about equal parts if more than one further reaction chamber is used. Naturally there can be added also into one of the following reaction chamber smaller amounts of acetone than there are added into another of the following reaction chambers but in general there should be added at least about ¼ mol of acetone per mol of p-aminodiphenylamine.

The reaction product can be worked up by methods which are known per se, for example by distillation or crystallisation.

It is surprising that the N-isopropyl-N'-phenyl-p-phenylene diamine is obtained in a high conversion rate with a substantially quantative yield and in very good quality when using the process of the present invention. If, however, the reaction of the p-aminodiphenylamine with acetone is carried out in the presence of elementary hydrogen and catalysts in such a way that the entire quantity of acetone is added to the first reaction chamber a substantially smaller conversion is produced with a substantially less satisfactory yield.

The following examples further illustrate the invention without limiting it thereto.

*Example*

A high pressure apparatus consisting of 3 series-connected high-pressure containers or tubes 4, 5 and 6 is employed. Each tube has an internal diameter of about 250 mm. and is about 8 m. long. The tubes are provided with two cooling or heating coils which extend into the tubes from the top and bottom. The tubes have a capacity of about 390 liters. The effective capacity, that is the capacity which is left after deducting the volume of the cooling coil, is about 315 liters.

500 kg. of p-aminodiphenylamine, 400 kg. of acetone and 10 kg. of catalyst are introduced into the agitating vessel 1. To start an operational period, an additional quantity of catalyst, for example 20 kg., is added to the first batch. About 700 kg. of this mixture, which consists of 54.95% of p-aminodiphenylamine, 43.95% of acetone and 1.10% of catalyst, are pumped into the first vessel reaction chamber 4 by means of the high-pressure pump 3 (that is about 384 kg. of p-aminodiphenylamine, 307 kg. of acetone and 7.7 kg. of catalyst). 130 kg. of acetone are additionally injected per hour from the vessel 2 by means of the high-pressure pump 10 into the second reaction chamber 5. The pressure in the system is 150 to 180 atmospheres. The temperatures in the reaction chamber 4, measured at regular intervals in the upward direction, are 140°—170°—185°—195° C. In the second reaction chamber 5, the temperatures are 210°—210°—205°—200° C. and in the third high-pressure pipe 6 (final reactor) they are between 190° and 195° C.

The temperature is regulated by suitable control of the coolant. Hydrogen under high pressure is introduced through the hydrogen pipe H in such a way that the pressure is always constant. The product leaving the high-pressure container 6, which product consists of N-isopropyl-N'-phenyl-p-phenylene diamine, a small quantity of acetone and isopropylalcohol is cooled in the condenser 7 to about 60° C., separated in the separator 8, collected in the reservoir 11 and thereafter worked up. Hydrogen is extracted at the top of the separator 8 by the circulating pump 9, which has a continuous volume of 1.8 m.³, and is re-introduced into the reaction chamber 4. This hydrogen serves for agitation purposes. The yield is substantially quantitative. The hourly capacity of the apparatus described is 472.5 kg. of N-isopropyl-N'-phenyl-p-phenylene diamine. After distillation, the product solidifies at approximately 78° C. and contains practically no p-aminodiphenylamine. It is also possible to reduce the acetone excess. For example, results which are almost equally good are obtained if 500 kg. of p-aminodiphenylamine, 160 kg. of acetone and 10 kg. of catalyst are supplied instead of the quantities indicated above to the agitating vessel 1 when using the process previously described and if approximately 520 kg. of this mixture (corresponding to 389 kg. of p-aminodiphenylamine, 123 kg. of acetone and 8 kg. of catalyst) are introduced each hour into the first chamber 4, only 60 kg. of acetone per hour being then additionally injected into the second reaction chamber 5.

The recovered catalyst can be used again.

If the entire quantity of acetone and p-aminodiphenylamine is only introduced into the first reaction chamber, that is if 384 kg. of p-aminodiphenylamine and 437 kg. of acetone are supplied to the first reaction chamber 4 each hour, only smaller yields and conversions are obtained. As in the first case, the product leaving the chamber contains little acetone. However, no N-isopropyl-N'-phenyl-p-phenylene diamine crystallises out. After distillation, the product has a solidification point of approximately 65° C. and consists of a mixture of p-aminodiphenylamine (about 20% by weight) and N-isopropyl-N'-phenyl-p-phenylene diamine.

We claim:

1. In a process for the production of N-isopropyl-N'-phenyl-p-phenylene diamine from p-aminodiphenylamine, acetone and hydrogen in a liquid phase process in the presence of catalysts at elevated pressure and temperature, the improvement of carrying out the process continuously in a plurality of series-connected reaction zones, wherein into each reaction zone there is introduced a portion of the total quantity of acetone used in the process, the amount of acetone added in the first reaction zone being at least 1 mol per each mol of p-aminodiphenylamine, and the amount of acetone added in the subsequent reaction zones being at least about 0.25 mol of acetone per mol of p-aminodiphenylamine, the total amount of acetone employed being approximately 1.5–4 mols acetone per mol of p-aminodiphenylamine.

2. In a process for the catalytic alkylation of p-aminodiphenylamine in a liquid phase process wherein p-aminodiphenylamine, acetone, and hydrogen react at elevated temperature and pressure to form N-isopropyl-N'-phenyl-p-phenylene diamine, the improvement of conducting the process continuously in a plurality of series-connected reaction zones, wherein into each reaction zone there is introduced a portion of the total quantity of acetone being used in the process, the amount of acetone added in the first zone being at least 1 mol per each mol of p-aminodiphenylamine, and the amount of acetone added in the subsequent reaction zones being at least about 0.25 mol of acetone per mol of p-aminodiphenylamine, the total amount of acetone employed being approximately 1.5–4 mols acetone per mol of p-aminodiphenylamine.

3. In a process for the continuous production of N-isopropyl-N'-phenyl-p-phenylene diamine by the catalytic alkylation of p-aminodiphenylamine with acetone and hydrogen at elevated pressure and temperature, the improvement of conducting the process continuously in a plurality of series-connected reaction zones, introducing into the first of said reaction zones all of the p-aminodiphenylamine and hydrogen and at least 1 mol of acetone per mol of p-aminodiphenylamine, and introducing the remainder of the acetone into subsequent reaction zones in proportions of at least about 0.25 mol of acetone per mol of p-aminodiphenylamine, said process being conducted in liquid phase, the total amount of acetone employed being approximately 1.5–4 mols acetone per mol of p-aminodiphenylamine.

References Cited in the file of this patent

UNITED STATES PATENTS

| | | |
|---|---|---|
| 2,494,059 | Ruggles | Jan. 10, 1950 |
| 2,650,252 | Mankowitch | Aug. 25, 1953 |
| 2,734,808 | Biswell | Feb. 14, 1956 |